US012373824B2

(12) United States Patent
So et al.

(10) Patent No.: US 12,373,824 B2
(45) Date of Patent: Jul. 29, 2025

(54) METHOD AND SYSTEM FOR PAYMENT FOR CENTRAL BANK DIGITAL CURRENCY

(71) Applicant: LINE Plus Corporation, Seongnam-si (KR)

(72) Inventors: Hongsup So, Seongnam-si (KR); Inseon Ryu, Seongnam-si (KR); Hwang Wook Kim, Seongnam-si (KR); Cheol Ung Lee, Seongnam-si (KR)

(73) Assignee: LINE PLUS Corporation, Gyeonggi-Do (KR)

( * ) Notice: Subject to any disclaimer, the term of this patent is extended or adjusted under 35 U.S.C. 154(b) by 0 days.

(21) Appl. No.: 18/420,617

(22) Filed: Jan. 23, 2024

(65) Prior Publication Data
US 2024/0202710 A1    Jun. 20, 2024

Related U.S. Application Data

(62) Division of application No. 17/410,047, filed on Aug. 24, 2021, now Pat. No. 11,922,404.

(30) Foreign Application Priority Data

Sep. 25, 2020   (KR) .................. 10-2020-0124440
Nov. 3, 2020    (KR) .................. 10-2020-0144950

(51) Int. Cl.
*G06F 21/53*    (2013.01)
*G06Q 20/06*    (2012.01)
*G06Q 20/36*    (2012.01)

(52) U.S. Cl.
CPC ......... *G06Q 20/3678* (2013.01); *G06F 21/53* (2013.01); *G06Q 20/0655* (2013.01)

(58) Field of Classification Search
CPC .......... G06Q 20/3678; G06Q 20/0655; G06Q 20/065; G06Q 20/10; G06Q 20/108; G06Q 20/4016; G06F 21/53
See application file for complete search history.

(56) References Cited

U.S. PATENT DOCUMENTS 11,424,915 B2     8/2022  Nishimura et al.
2005/0216739 A1*  9/2005  Lee .................. G06F 21/10
                                                  713/168
(Continued)

FOREIGN PATENT DOCUMENTS

CN    102081821 A  *  6/2011  ............ G06Q 20/20
CN    106850200 A  *  6/2017  ............ G06Q 20/065
(Continued)

OTHER PUBLICATIONS

"Digital signature forming and keys protection based on person's characteristics", Ahmed B. Elmadani, Sebha University, 2012 International Conference on Information Technology and e-Services (Year: 2012).*

(Continued)

*Primary Examiner* — Duan Zhang
(74) *Attorney, Agent, or Firm* — Harness, Dickey & Pierce, P.L.C.

(57) ABSTRACT

Payment methods and systems for processing a payment using a Central Bank Digital Currency (CBDC) without a double payment in an offline situation (e.g., in a situation in which a terminal of a user is unable to be connected) to a server through a network may be provided.

6 Claims, 5 Drawing Sheets

(56) References Cited

U.S. PATENT DOCUMENTS

2017/0295023 A1* 10/2017 Madhavan .............. G06F 21/40
2021/0012331 A1    1/2021 Higgins

FOREIGN PATENT DOCUMENTS

| KR | 10-2016-0030294 A | 3/2016 |
| KR | 10-2016-0098756 A | 8/2016 |
| KR | 10-2018-0007459 A | 1/2018 |
| KR | 10-1862637 B1 | 7/2018 |
| WO | WO-2019197926 A1 | 10/2019 |

OTHER PUBLICATIONS

Korean Office Action dated Apr. 25, 2023 issued in corresponding Korean Patent Application No. 10-2020-0144950.
Antonio Marcedone, "Secure computation in the real world", May 2019, Cornell University.

* cited by examiner

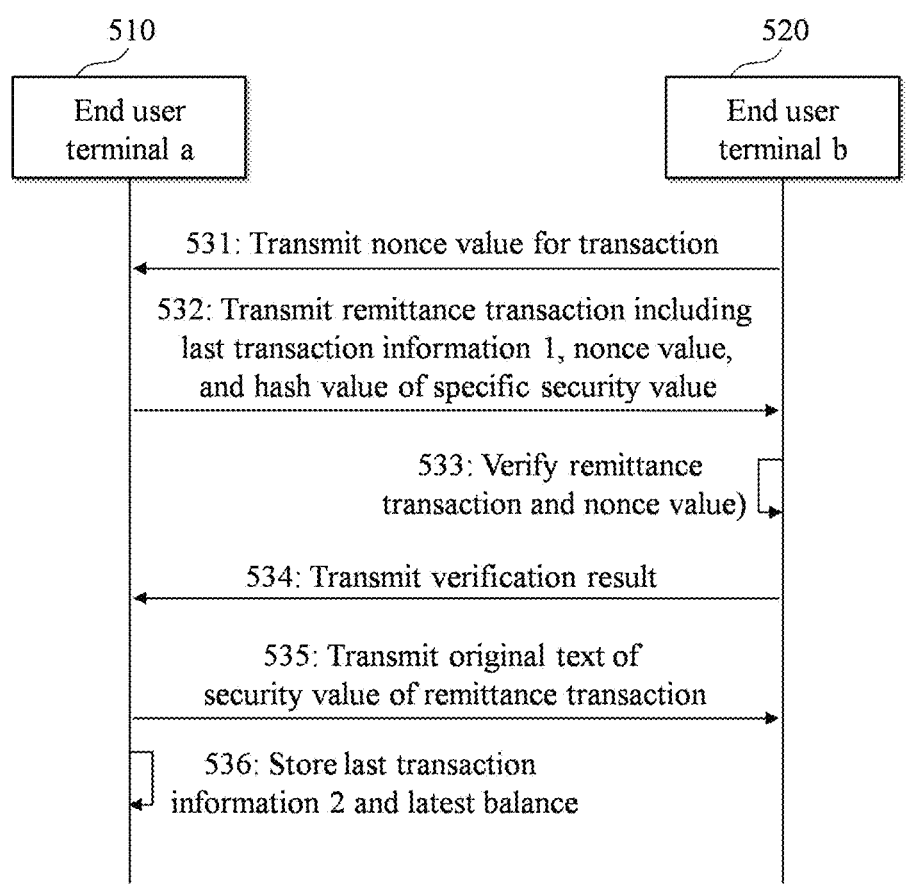

METHOD AND SYSTEM FOR PAYMENT FOR CENTRAL BANK DIGITAL CURRENCY

CROSS-REFERENCE TO RELATED APPLICATION(S)

This U.S. non-provisional application is a divisional of U.S. application Ser. No. 17/410,047, filed on Aug. 24, 2021, which claims the benefit of priority under 35 U.S.C. § 119 to Korean Patent Application No. 10-2020-0124440, filed Sep. 25, 2020, and Korean Patent Application No. 10-2020-0144950, filed Nov. 3, 2020, the entire contents of each of which are incorporated herein by reference in their entirety.

BACKGROUND

Technical Field

One or more example embodiments relate to payment methods and/or systems for a Central Bank Digital Currency (CBDC).

Related Art

A Central Bank Digital Currency (CBDC) refers to an electronic currency issued by a central bank and a CBDC implementation method may be classified into a single ledger method (an account method) in which a central bank or a bank stores and manages CBDC account and related transaction information and a distributed ledger method in which a plurality of transaction participants manages the same transaction record.

SUMMARY

One or more example embodiments provide payment methods and/or systems that may process a payment using Central Bank Digital Currency (CBDC) without a double payment in an offline situation (e.g., in a situation in which a terminal of a user is unable to connect to a server through a network).

According to an aspect of at least one example embodiment, a payment method of a computer apparatus including a security area, a hardware security module (HSM), and at least one processor, includes, by the at least one processor, receiving a nonce value from a terminal of an end user that is to receive a remittance through short-distance communication in an offline situation, signing a remittance transaction including first last transaction information stored in the security area, the received nonce value, and a hash value of a security value using a private key of the HSM and transmitting the signed remittance transaction to the terminal, transmitting an original text of the security value to the terminal in response to receiving a verification success message from the terminal, and storing second last transaction information according to the signed remittance transaction and latest balance of an electronic wallet (E-wallet) in the security area.

The security area may include a trusted execution environment (TEE) security area or a white-box cryptographic (WBC) security area.

The payment method further includes In response to a change from the offline situation to an online situation, transmitting the signed remittance transaction and the original text of the security value to a Central Bank Digital Currency (CBDC) ledger and causing a transaction occurring in the offline situation to be synchronized with the CBDC ledger.

The payment method may further include authenticating, by the at least one processor, the terminal by exchanging a certificate with the terminal.

The certificate may include device-specific information of a device to which the certificate is issued, public information of an HSM included in the device, issuing authority information, and an expiration date, and is stored in the security area.

Signature verification of the remittance transaction may be processed at the terminal using public information of the HSM included in the certificate of the computer apparatus.

The signing and the transmitting of the remittance transaction may include transmitting public information of the HSM to the terminal, and processing signature verification of the remittance transaction at the terminal using the public information of the HSM.

According to an aspect of at least one example embodiment, a payment method of a computer apparatus including a first security area, an HSM, and at least one processor includes, by the at least one processor, transmitting a nonce value to a terminal of an end user that is configured to perform a remittance through short-distance communication in an offline situation, receiving, from the terminal, a remittance transaction that is signed using a private key of an HSM of the terminal, the remittance transaction including first last transaction information stored in a second security area of the terminal, the transmitted nonce value, and a hash value of a security value, performing signature verification on the received remittance transaction, verifying the nonce value included in the received remittance transaction, transmitting a verification success message to the terminal in response to succeeding in the signature verification and verification of the nonce value, storing the received remittance transaction and a second last transaction in the first security area, and receiving an original text of the security value transmitted from the terminal in response to receiving the verification success message.

Each of the first security area and the second security area may include a TEE security area or a WBC security area.

The payment method may further include, transmitting, by the at least one processor, the remittance transaction stored in the first security area and the original text of the security value to a Central Bank Digital Currency (CBDC) ledger to cause a transaction occurring in the offline situation to be synchronized with the CBDC ledger, in response to a change from the offline situation to an online situation.

The payment method may further include authenticating, by the at least one processor, the terminal by exchanging a certificate with the terminal.

The certificate may include device-specific information of a device to which the certificate is issued, public information of an HSM included in the device, issuing authority information, and an expiration date, and is stored in a security area included in the device.

The performing signature verification may include performing signature verification of the remittance transaction using public information of the HSM included in the terminal, the issuing authority information, and the expiration date.

The receiving remittance transaction may include receiving public information of the HSM included in the terminal from the terminal, and the performing signature verification may include performing the signature verification of the remittance transaction using the received public information of the HSM.

According to an aspect of at least one example embodiment, there is provided a non-transitory computer-readable record medium storing instructions that, when executed by a processor, cause processor computer apparatus to perform the method.

According to an aspect of at least one example embodiment, a computer apparatus includes at least one processor configured to execute computer-readable instructions, a security area, and an HSM. The at least one processor is configured to cause the computer apparatus to receive a nonce value from a terminal of an end user that is to receive a remittance through short-distance communication in an offline situation, sign a remittance transaction including first last transaction information stored in the security area, the received nonce value, and a hash value of a security value using a private key of the HSM and transmit the signed remittance transaction to the terminal, transmit an original text of the security value of the signed remittance transaction to the terminal in response to receiving a verification success message from the terminal, and store second last transaction information according to the remittance transaction and latest balance of an E-wallet in the security area.

According to an aspect of at least one example embodiment, a computer apparatus includes at least one processor configured to execute computer-readable instructions, a first security area, and an HSM. The at least one processor is configured to cause the computer apparatus to transmit a nonce value to a terminal of an end user that is configured to perform a remittance through short-distance communication in an offline situation, receive, from the terminal, a remittance transaction that is signed using a private key of an HSM of the terminal, the remittance transaction including first last transaction information stored in a second security area of the terminal, the transmitted nonce value, and a hash value of a security value, perform signature verification on the received remittance transaction, verify the nonce value included in the received remittance transaction, transmit a verification success message to the terminal in response to succeeding in the signature verification and verification of the nonce value, store the received remittance transaction and a second last transaction in the first security area, and receive an original text of the security value transmitted from the terminal in response to receiving the verification success message.

According to some example embodiments, it is possible to process a payment using a CBDC without a double payment in an offline situation (e.g., in a situation in which a terminal of a user is unable to connect to a server through a network).

Further areas of applicability will become apparent from the description provided herein. The description and specific examples in this summary are intended for purposes of illustration only and are not intended to limit the scope of the present disclosure.

BRIEF DESCRIPTION OF DRAWINGS

FIG. 5 is a flowchart illustrating an example of an offline payment method according to at least one example embodiment.

DETAILED DESCRIPTION

Figure 1:
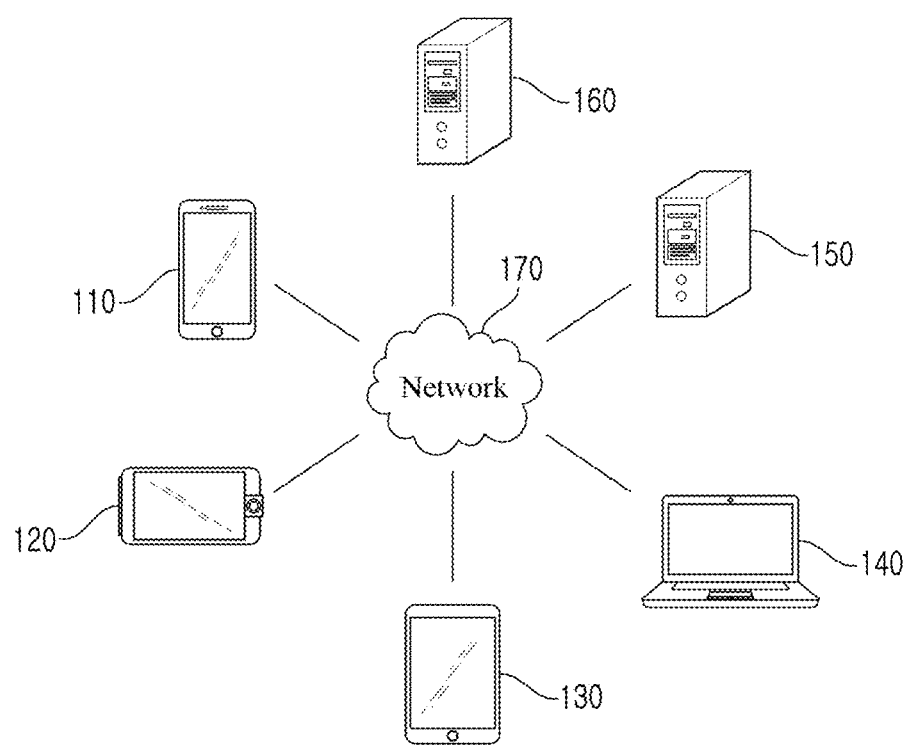
FIG. 1 is a diagram illustrating an example of a network environment according to at least one example embodiment.

One or more example embodiments will be described in detail with reference to the accompanying drawings. Example embodiments, however, may be embodied in various different forms, and should not be construed as being limited to only the illustrated example embodiments. Rather, the illustrated example embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products.

Expressions such as "at least one of," when preceding a list of elements, modify the entire list of elements and do not modify the individual elements of the list. Also, the term "exemplary" is intended to refer to an example or illustration.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, some example embodiments will be described with reference to the accompanying drawings.

A payment system according to the example embodiments may be implemented by at least one computer apparatus. Here, a computer program may be installed and executed on the computer apparatus and the computer apparatus may perform a payment method according to the example embodiments under control of the executed computer program. The aforementioned computer program may be stored in a non-transitory computer-readable record medium to computer-implement the payment method in conjunction with the computer apparatus.

FIG. 1 illustrates an example of a network environment according to at least one example embodiment. Referring to FIG. 1, the network environment may include a plurality of electronic devices 110, 120, 130, and 140, a plurality of servers 150 and 160, and a network 170. FIG. 1 is provided as an example only. A number of electronic devices or a number of servers is not limited thereto. Also, the network environment of FIG. 1 is provided as an example of environments applicable to the example embodiments, and environments applicable to the example embodiments are not limited to the network environment of FIG. 1.

Each of the plurality of electronic devices 110, 120, 130, and 140 may be a fixed terminal or a mobile terminal that is configured as a computer apparatus. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet PC, and the like. For example, although FIG. 1 illustrates a shape of a smartphone as an example of the electronic device 110, the electronic device 110 used herein may refer to one of various types of physical computer apparatuses capable of communicating with other electronic devices 120, 130, and 140, and/or the servers 150 and 160 over the network 170 in a wireless or wired communication manner.

The communication scheme is not limited and may include a near field wireless communication scheme between devices as well as a communication scheme using a communication network (e.g., a mobile communication network, wired Internet, wireless Internet, or a broadcasting network) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), or the Internet. Also, the network 170 may include at least one of network topologies that include a bus network, a star network, a ring network, a mesh network, a star-bus network, a tree or hierarchical network, and the like. However, they are provided as examples only.

Each of the servers 150 and 160 may be configured as a computer apparatus or a plurality of computer apparatuses that provides an instruction, a code, a file, content, a service, etc., through communication with the plurality of electronic devices 110, 120, 130, and 140 over the network 170. For example, the server 150 may be a system that provides a service to the plurality of electronic devices 110, 120, 130, and 140 connected over the network 170. For example, the service may include a payment service, a virtual exchange service, a risk monitoring service, an instant messaging service, a game service, a group call service or a voice conference service, a messaging service, a mail service, a social network service, a map service, a translation service, a financial service, a search service, and a content providing service.

Figure 2:
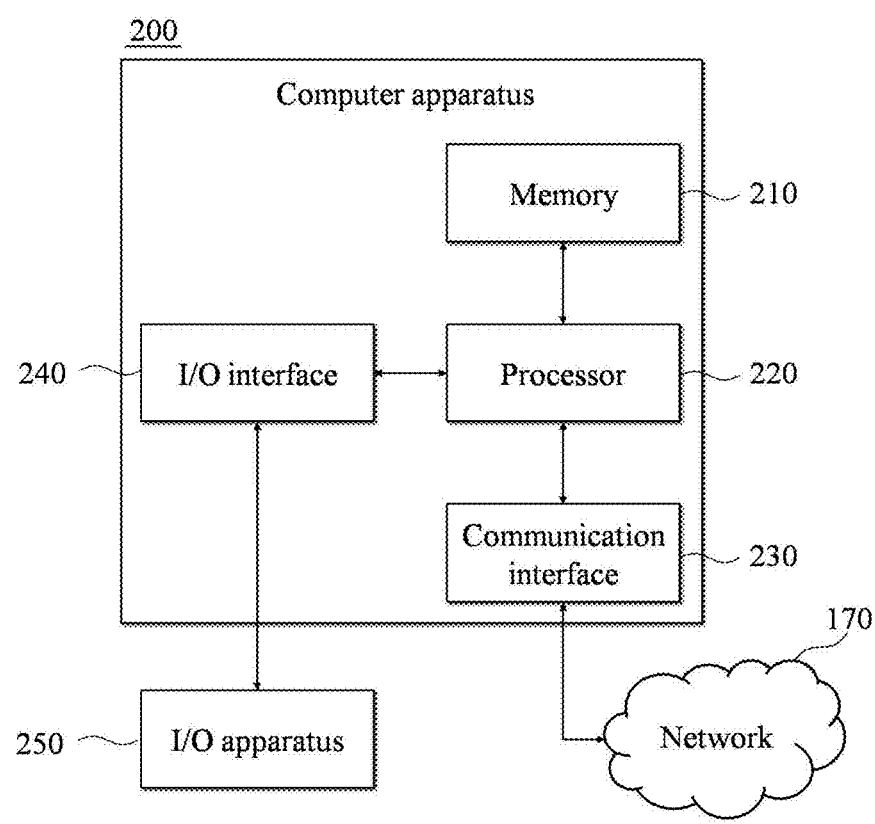
FIG. 2 is a diagram illustrating an example of a computer apparatus according to at least one example embodiment.

FIG. 2 is a block diagram illustrating an example of a computer apparatus according to at least one example embodiment. Each of the plurality of electronic devices 110, 120, 130, and 140 or the servers 150 and 160 may be implemented in a computer apparatus 200 of FIG. 2.

Referring to FIG. 2, the computer apparatus 200 may include a memory 210, a processor 220, a communication interface 230, and an input/output (I/O) interface 240. The memory 210 may include a permanent mass storage device, such as a random access memory (RAM), a read only memory (ROM), and a disk drive, as a non-transitory computer-readable record medium. The permanent mass storage device, such as ROM and disk drive, may be included in the computer apparatus 200 as a permanent storage device separate from the memory 210. Also, an OS and at least one program code may be stored in the memory 210. Such software components may be loaded to the memory 210 from another non-transitory computer-readable record medium separate from the memory 210. The other non-transitory computer-readable record medium may include a non-transitory computer-readable record medium, for example, a floppy drive, a disk, a tape, a DVD/CD-ROM drive, a memory card, etc. According to other example embodiments, software components may be loaded to the memory 210 through the communication interface 230, instead of the non-transitory computer-readable record medium. For example, the software components may be loaded to the memory 210 of the computer apparatus 200 based on a computer program installed by files provided over the network 170.

The processor 220 may be configured to process instructions of a computer program by performing basic arithmetic operations, logic operations, and I/O operations. The computer-readable instructions may be provided from the memory 210 or the communication interface 230 to the processor 220. For example, the processor 220 may be configured to execute received instructions in response to the program code stored in the storage device, such as the memory 210.

The communication interface 230 may provide a function for communication between the computer apparatus 200 and other apparatuses, for example, the aforementioned storage devices, over the network 170. For example, the processor 220 of the computer apparatus 200 may transfer a request created based on a program code stored in the storage device such as the memory 210, to the other apparatuses over the network 170 under control of the communication interface 230. Inversely, a signal, an instruction, data, a file, etc., from another apparatus may be received at the computer apparatus 200 through the communication interface 230 of the computer apparatus 200. For example, a signal, an instruction, data, etc., received through the communication interface 230 may be transferred to the processor 220 or the memory 210, and a file, etc., may be stored in a storage medium, for example, the permanent storage device, further includable in the computer apparatus 200.

The I/O interface 240 may be a device used for interface with an I/O apparatus 250. For example, an input device may include a device, such as a microphone, a keyboard, or a mouse, and an output device may include a device, such as a display or a speaker. As another example, the I/O interface 240 may be a device for interface with an apparatus in which an input function and an output function are integrated into a single function, such as a touchscreen. At least one I/O apparatus 250 may be configured as a single device with the computer apparatus 200. For example, the I/O apparatus 250 may be implemented in a form in which a touchscreen, a microphone, and a speaker are included in the computer apparatus 200, such as a smartphone.

According to other example embodiments, the computer apparatus 200 may include a number of components greater than or less than a number of components shown in FIG. 2. However, there is no need to clearly illustrate many components according to the related art. For example, the computer apparatus 200 may include at least a portion of the I/O apparatus 250, or may further include other components, for example, a transceiver or a database (DB).

To process a payment using a Central Bank Digital Currency (CBDC), an end user terminal needs to frequently update information of a ledger through communication with a server. Meanwhile, even in an offline situation such as a situation in which the end user terminal is unable to connect to a network, a payment needs to be made between end users. In such a situation, a double payment needs to be blocked or prevented and the end users need to be authenticable.

Figure 3:
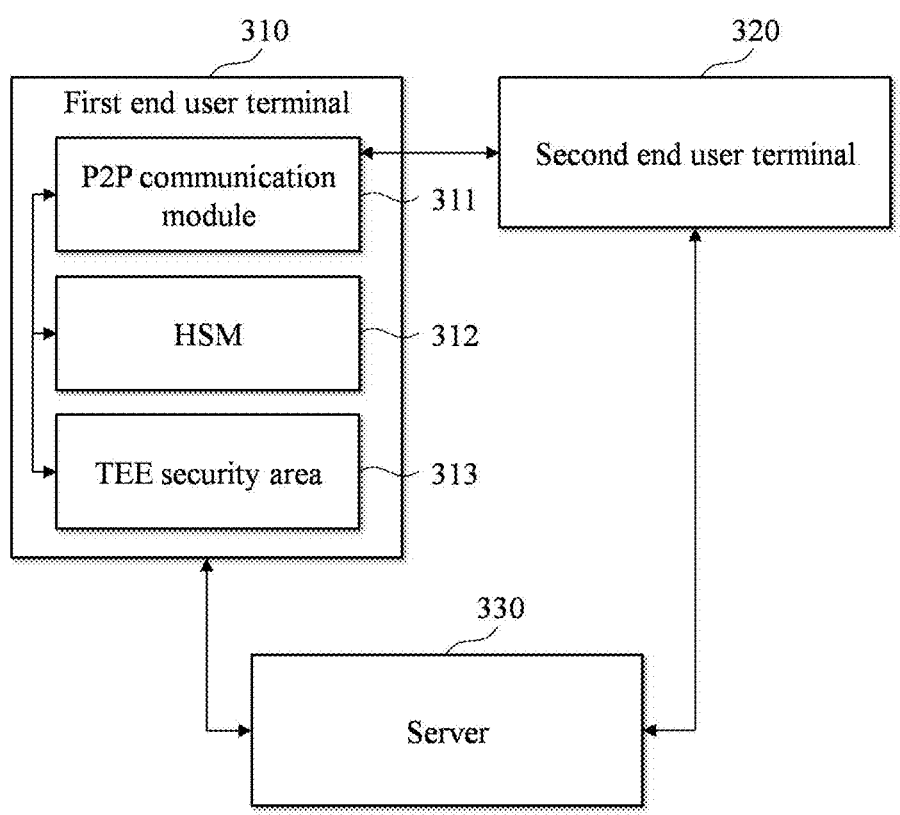
FIG. 3 illustrates an example of an internal configuration of an end user terminal according to at least one example embodiment.

FIG. 3 illustrates an example of an internal configuration of an end user terminal according to at least one example embodiment. Although a first end user terminal 310 and a second end user terminal 320 may process a payment through communication with a server 330, an offline payment between end user terminals (e.g., the first end user terminal 310 and the second end user terminal 320) may be processed through communication between the end user terminals in an offline situation. When communication with the server 330 is enabled, the end user terminals (e.g., the first end user terminal 310 and the second end user terminal 320) may synchronize contents of the offline payment with the server 330. The server 330 may be a server apparatus of a service provider that processes a payment using a Central Banking Digital Currency (CBDC) between a CBDC platform and the end user terminals. The term CBDC refers to various proposals involving issued by a digital currency central bank. Herein, unless particularly defined, the term "server" may refer to a server of a service provider.

To block or prevent a double payment in the offline payment, referring to FIG. 3, the first end user terminal 310 may include a peer-to-peer (P2P) communication module 311, a hardware security module (HSM) 312, and a trusted execution environment (TEE) security area 313. The second end user terminal 320 may have an internal configuration identical or similar to that of the first end user terminal 310. The first end user terminal 310 and the second end user terminal 320 may be implemented by the computer apparatus 200 of FIG. 2, and in the example embodiment of FIG. 3, components that are not essential for the offline payment are omitted.

The P2P communication module 311 may include a communication module for short-distance communication, such as Bluetooth and near field communication (NFC). To enable a payment between end users even in a situation in which a user is unable to communicate with the server 330 through a network (e.g., in an offline situation in which a temporary network failure or a failure caused by a disaster occurs), communication between terminals of at least two end users (e.g., the first end user terminal 310 and the second end user terminal 320 of FIG. 3) needs to be enabled. Therefore, the P2P communication module 311 may be desired.

The HSM 312 may include a module configured to manage and protect a private key that disallows physical duplication and extraction. In general, instead of loading, to a memory, and using a private key such as an encryption key in an encryption application programming interface (API), the HSM 312 may use a method of transmitting data to an inside of the HSM 312 and receiving a result value when performing encryption and decryption of the data. Therefore, because the private key is internally managed and is not leaked to an outside and an encryption operation is performed inside the HSM 312, the leak of the private key may be fundamentally blocked or prevented. For example, the computer apparatus 200 of FIG. 2 may further include a physical device for the HSM 312.

The TEE security area 313 may provide a hardware-independent security area and may provide a security function (e.g., integrity of an application program and confidentiality of data) in a trusted execution environment (e.g., secure execution environment). For example, the processor 220 included in the computer apparatus 200 of FIG. 2 may include a TEE function for providing of the TEE security area 313.

Depending on some example embodiments, the TEE security area 313 configured in a hardware manner may be replaced with software technology. For example, white-box cryptographic (WBC) refers to software technology that may securely store data and may block or prevent the stored data from being revealed even when an encryption algorithm is executed on an untrusted terminal.

It will be easily understood that the following TEE-based security area may be expanded to a "security area" that includes one of a hardware security area or a software security area.

Because NFC or Bluetooth for short-distance communication, an HSM, a TEE, and the like are already well-known, further description is omitted.

To process a payment in an offline situation, it is assumed that a payment method according to some example embodiments meets the following conditions (1) to (5).

(1) Each of end user terminals (e.g., each of the first end user terminal 310 and the second end user terminal 320) may be an HSM device having a unique private key. That is, at least two end user terminals do not have the same private key.

(2) The latest information signed by an end user terminal may be recorded in the TEE, and for every signature, a corresponding signature may be processed using information recorded in the TEE. For example, the latest information signed by the first end user terminal 310 may be recorded in the TEE security area 313, and the first end user terminal 310 may process a subsequent signature using the latest information recorded in the TEE security area 313.

(3) Information about a final balance synchronized with the server 330 is recorded in the TEE. For example, the first end user terminal 310 may record information about the final balance synchronized through communication with the server 330 in the TEE security area 313.

(4) An electronic wallet (E-wallet) of a user having completed a know your customer (KYC) authentication is allowed to be used. The KYC authentication refers to a process of verifying the identity of your customers, either before or during the time that an end user starts doing business with the server of a service provider. The term "KYC" also refer to regulated bank customer identity verification practices to assess and monitor customer risk. Depending on some example embodiments, the KYC authentication may be selectively processed to be used by a foreigner. Although an E-wallet having not completed the KYC authentication is allowed to be used, restrictions (e.g., restricting an upper limit of a payable amount) may be set to apply to the E-wallet.

(5) A public key infrastructure (PKI)-based certificate is issued from a certification authority (CA) to an only device that is to use an HSM (e.g., the HSM 312). Here, the certificate may not be issued twice and may be stored in the TEE (e.g., the TEE security area 313). Certificate information may include device-specific information, public information of the HSM, issuing authority information, and an expiration date. For example, the device-specific information may include information capable of uniquely identifying an end user terminal. The public information may include information (e.g., a public key) published in correspondence to a private key stored in the HSM.

Although an example embodiment in which the first end user terminal 310 includes the P2P communication module 311, the HSM 312, and the TEE security area 313 is described with reference to FIG. 3, the example embodiment of FIG. 3 may be implemented in a form in which a device (e.g., a smartphone) supporting a TEE and smart HSM-equipped device (e.g., ledger Nano, Trezor, and YubiKey) are combined, or in a form in which a device (e.g., a point of sales (POS) or a smartphone) supporting a network and a TEE and HSM-equipped device (e.g., an HSM card having a secure storage device) are combined.

In the case of a smartphone, equipment chargeable with a portable charging device or a battery may be purchased at low price and a no-power situation may be easily prepared for. Further, in the case of a separately developed end user terminal, a built-in battery chargeable with a micro-USB or USB-C may be provided to be chargeable with a portable charging device or a battery to prepare for a no-power situation accordingly. If an end user terminal is developed as a card-type small device, a battery replacement is possible and a design for a long-time use with low power is desired.

Meanwhile, in the case of issuing a certificate to the end user terminal (e.g., the first end user terminal 310 or the second end user terminal 320) or in the case of setting use of the end user terminal for processing, an intermediary (e.g., other financial institutions excluding a central bank) may perform an authentication process (e.g., a KYC authentication and/or an ID/password authentication).

A certificate may be issued to the end user terminal of which authentication is completed. In other words, a certificate may be issued to the authenticated end user terminal. As described above, device-specific information, public information of HSM, issuing authority information, and an expiration date may be signed and included in the certificate. The expiration date may be used to periodically reissue the certificate and to maintain the latest information.

When the user uses the end user terminal, a device user authentication may be processed through a password or a biometric authentication (e.g., a fingerprint, an iris, or a facial recognition). For example, when the user desires to make a payment using the end user terminal, a payment program installed and executed on the end user terminal may control the end user terminal such that the end user terminal may initially authenticate the user by performing the device user authentication.

When performing an authentication between users during an online access or offline, information used when receiving an authentication from a CA (e.g., device-specific information, public information of an HSM, issuing authority information, and an expiration date) may be transmitted to a server or an end user terminal of another user with the certificate and the authentication of the end user terminal of the user may be performed.

Figure 4:
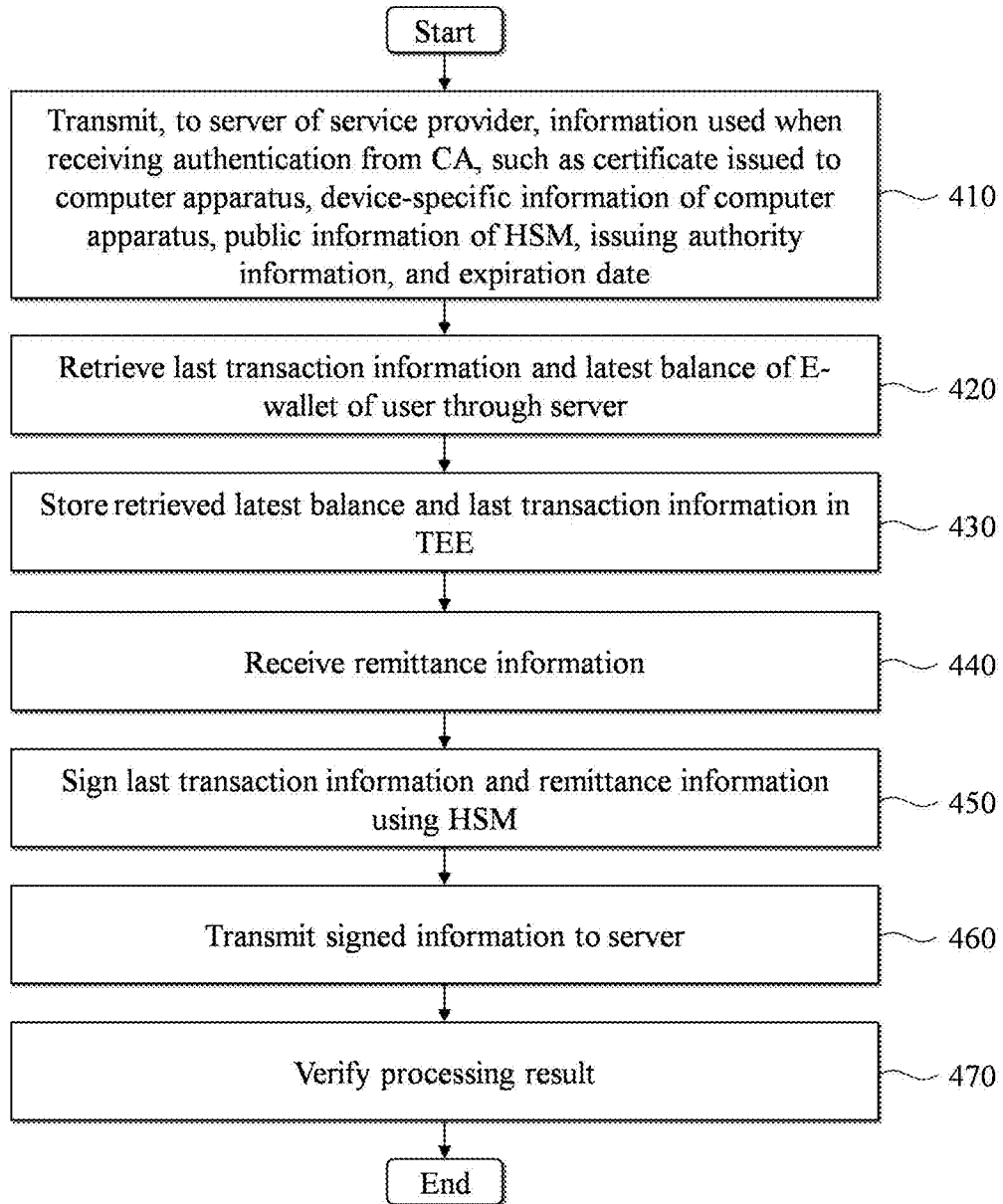
FIG. 4 is a flowchart illustrating an example of an online payment method according to at least one example embodiment.

FIG. 4 is a flowchart illustrating an example of an online payment method according to at least one example embodiment. The online payment method of FIG. 4 may be performed by the computer apparatus 200 that implements an end user terminal. Here, the processor 220 of the computer apparatus 200 may be configured to execute a control instruction according to a code of at least one computer program or a code of an OS included in the memory 210. Here, the processor 220 may control the computer apparatus 200 to perform operations 410 to 470 included in the online payment method of FIG. 4 in response to the control instruction provided from a code stored in the computer apparatus 200.

Referring to FIG. 4, in operation 410, the computer apparatus 200 may transmit, to a server of a service provider, information used when receiving authentication from a CA, such as a certificate issued to the computer apparatus 200, device-specific information of the computer apparatus 200, and public information of an HSM, issuing authority information, and an expiration date. In this case, the server of the service provider may authenticate the computer apparatus 200 as an end user terminal based on the information used when receiving the authentication from the CA that includes, for example, the transmitted certificate, the device-specific information, the public information of the HSM, the issuing authority information, and the expiration date.

In operation 420, the computer apparatus 200 may retrieve the last transaction information (sequence number) and the latest balance of an E-wallet of a user through the server.

In operation 430, the computer apparatus 200 may store the retrieved latest balance and last transaction information in a TEE. As described above, a TEE-based security area configured in a hardware manner may be replaced with software technology (e.g., WBC).

In operation 440, the computer apparatus 200 may receive remittance information. For example, the computer apparatus 200 may receive remittance amount and receiver information from the user.

In operation 450, the computer apparatus 200 may sign the last transaction information and the remittance information using the HSM. For example, the last transaction information and the remittance information may be signed using a private key included in the HSM.

In operation 460, the computer apparatus 200 may transmit the signed information to the server. The server may forward the remittance amount to the E-wallet of the user based on the transmitted information and may process a corresponding payment by subtracting the remittance amount from the E-wallet of the user.

In operation 470, the computer apparatus 200 may verify a processing result. Here, once the processing is completed, the computer apparatus 200 may store the latest balance of the E-wallet and the last transaction information in the TEE.

FIG. 5 illustrates an example of an offline payment method according to at least one example embodiment. The example embodiment refers to an example in which communication with a server of a service provider is impossible, and thus a payment between an end user terminal a 510 of an end user A to send an amount and an end user terminal b 520 of an end user B to receive the amount is processed through P2P communication (hereinafter, short-distance communication) using a local area network. Initially, the end user terminal a 510 and the end user terminal b 520 may verify that they are authenticated devices by exchanging certificates through the short-distance communication. Each of the end user terminal a 510 and the end user terminal b 520 may be implemented by the computer apparatus 200 and each may include a TEE security area and an HSM.

In operation 531, the end user terminal b 520 may transmit a nonce value for transaction to the end user terminal a 510. The nonce value may be a value randomly generated.

In operation 532, the end user terminal a 510 may transmit, to the end user terminal b 520, a remittance transaction including the last transaction information 1, the nonce value, and a hash value of a specific security value using a private key of the HSM. Here, the last transaction information 1 may include a sequence number stored in a TEE and the specific security value may be a value that is randomly generated. Here, the remittance transaction may be signed using a private key of an HSM and may be transmitted to the end user terminal b 520 with a public key as the public information of the HSM. Depending on some example embodiments, without a need for the end user terminal a 510 to transmit the public key as the public information of the HSM to the end user terminal b 520, the end user terminal b 520 may acquire the public key as the public information of the HSM from the certificate of the end user terminal a 510.

In operation 533, the end user terminal b 520 may verify the received remittance transaction and nonce value. For example, the end user terminal b 520 may process signature verification on the received remittance transaction using the public key and may verify whether the nonce value included in the remittance transaction is identical to the nonce value transmitted in operation 531. Here, when the signature verification on the received remittance transaction fails, when the received nonce value differs from the nonce value transmitted in operation 531, or when the processed nonce value is received, the end user terminal b 520 may transmit a failure message to the end user terminal a 510. Further, the end user terminal b 520 may store the received remittance transaction with the last transaction information 2. Here, the last transaction information 2 may be information about a current transaction, which differs from the last transaction information 1.

In operation 534, the end user terminal b 520 may transmit a verification result to the end user terminal a 510. For example, the end user terminal b 520 may transmit a verification success message or a verification failure message to the end user terminal a 510.

In operation 535, if the verification result is a success, the end user terminal a 510 may transmit an original text of a security value of the remittance transaction to the end user terminal b 520. If the end user terminal a 510 does not receive the verification success message from the end user terminal b 520 within a desired period of time, the transaction may be cancelled. In this case, the end user terminal b 520 may not receive the original text of the security value.

In operation 536, the end user terminal a 510 may store the last transaction information 2 and the latest balance in the TEE. The latest balance may be the latest balance of an E-wallet of the end user A.

If the communication is restored, the end user terminal b 520 may transmit the remittance transaction and the original text of the security value received from the end user terminal a 510 to a CBDC ledger and a transaction occurring in an offline situation from the end user terminal a 510 to the end user terminal b 520 may be sequentially synchronized with the ledger. If the end user terminal b 520 does not receive the original text of the security value in operation 535, synchronization with the ledger may fail and the corresponding transaction may be substantially cancelled. Because the last transaction information needs to be updated through this transaction, the last transaction information 2 may be information about the current transaction, which differs from the last transaction information 1. Depending on some example embodiments, at least a portion of the last transaction information 2 stored in the TEE of the end user terminal a 510 in operation 536 and the last transaction information 2 stored in the TEE of the end user terminal b 520 in operation 533 may differ from each other.

The following restrictions (a), (b), and (c) may apply depending on some example embodiments.

(a) A transaction amount received in an offline situation may be unavailable online without synchronization with a CBDC ledger service.

(b) An amount available at an end user terminal may be limited.

(c) By setting at least one of the limit of an amount available offline, a number of transactions, or an effective time for performing a transaction offline, a transaction may be limited.

According to the example embodiment, all the transactions of an E-wallet linked with an HSM are processed at an end user terminal including the corresponding HSM. For example, because a private key of the HSM may not be duplicated, it is possible to guarantee that all the transactions of the linked E-wallet are processed at the end user terminal including the corresponding HSM. Further, because whether device-specific information recorded in a certificate and public information of the HSM are identical may be verified through authentication of the E-wallet, it may not be used at another device. Further, according to the example embodiment, a completed transaction may be stored in a TEE, and thus may not be forcibly corrected. Here, because a transaction is performed only in a single end user terminal, information stored in the TEE is the latest information at all times. Accordingly, a double payment may be blocked or prevented.

Although the example embodiment describes a TEE-based security area configured in a hardware manner, such a TEE may be replaced with software technology such as WBC.

As described above, according to some example embodiments, it is possible to process a payment using a CBDC without a double payment in an offline situation (e.g., in a situation in which a terminal of a user is unable to connect to a server through a network).

The systems or the apparatuses described above may be implemented using hardware components or a combination of hardware components and software components. For example, the apparatuses and the components described herein may be implemented using one or more general-purpose or special purpose computers (e.g., a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner). The processing device may run an operating system (OS) and one or more software applications that run on the OS. The processing device also may access, store, manipulate, process, and create data in response to execution of the software. For simplicity, the description of a processing device is used as singular. However, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable storage mediums.

The methods according to the above-described example embodiments may be configured in a form of program instructions performed through various computer devices and recorded in non-transitory computer-readable media. The media may also include, alone or in combination with the program instructions, data files, data structures, and the like. The media may continuously store computer-executable programs or may temporarily store the same for execution or download. The media may be various types of recording devices or storage devices in a form in which one or a plurality of hardware components are combined. Without being limited to media directly connected to a computer system, the media may be distributed over the network. Examples of the media include magnetic media such as hard disks, floppy disks, and magnetic tapes; optical media such as CD-ROM and DVDs; magneto-optical media such as floptical disks; and hardware devices that are specially configured to store and perform program instructions, such as ROM, RAM, flash memory, and the like. Examples of other media may include recording media and storage media managed by an app store that distributes applications or a site, a server, and the like that supplies and distributes other various types of software. Examples of a program instruction may include a machine language code produced by a compiler and a high-language code executable by a computer using an interpreter.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

What is claimed is:

1. A payment method of a computer apparatus comprising a first security area, a hardware security module (HSM), and at least one processor, the payment method comprising:
   transmitting, by the at least one processor, a nonce value to a terminal of an end user that is configured to perform a remittance through short-distance communication in an offline situation;
   receiving, by the at least one processor, from the terminal a remittance transaction that is signed using a private key of an HSM of the terminal, the remittance transaction including first last transaction information stored in a second security area of the terminal, the transmitted nonce value, and a hash value of a security value;
   performing, by the at least one processor, signature verification on the received remittance transaction;
   verifying, by the at least one processor, the nonce value included in the received remittance transaction;
   transmitting, by the at least one processor, a verification success message to the terminal in response to a success in the signature verification and verification of the nonce value;
   storing, by the at least one processor, the received remittance transaction and a second last transaction in the first security area;
   receiving, by the at least one processor, an original text of the security value transmitted from the terminal in response to receiving the verification success message; and
   in response to a change from the offline situation to an online situation,
   automatically transmitting, by the at least one processor, the remittance transaction stored in the first security area and the original text of the security value to a Central Bank Digital Currency (CBDC) ledger to cause a transaction occurring in the offline situation to be synchronized with the CBDC ledger,
   wherein each of the first security area and the second security area comprises a trusted execution environment (TEE) security area being a hardware-independent security area or a white-box cryptographic (WBC) security area.

2. The payment method of claim 1, further comprising:
   authenticating, by the at least one processor, the terminal by exchanging a certificate with the terminal.

3. The payment method of claim 2, wherein the certificate comprises device-specific information of a device to which the certificate is issued, public information of an HSM included in the device, issuing authority information, and an expiration date, and is stored in a security area included in the device.

4. The payment method of claim 3, wherein the performing signature verification comprises performing signature verification of the remittance transaction using the public information of the HSM included in the terminal, the issuing authority information, and the expiration date.

5. The payment method of claim 1, wherein
   the receiving the remittance transaction comprises receiving public information of the HSM comprised in the terminal from the terminal, and
   the performing the signature verification comprises performing the signature verification of the remittance transaction using the received public information of the HSM.

6. A computer apparatus comprising:
at least one processor configured to execute computer-readable instructions;
a first security area; and
a hardware security module (HSM),
wherein the at least one processor is configured to cause the computer apparatus to,
transmit a nonce value to a terminal of an end user that is configured to perform a remittance through short-distance communication in an offline situation,
receive, from the terminal, a remittance transaction that is signed using a private key of an HSM of the terminal, the remittance transaction including first last transaction information stored in a second security area of the terminal, the transmitted nonce value, and a hash value of a security value,
perform signature verification on the received remittance transaction,
verify the nonce value included in the received remittance transaction,
transmit a verification success message to the terminal, in response to a success in the signature verification and verification of the nonce value,
store the received remittance transaction and a second last transaction in the first security area,
receive an original text of the security value transmitted from the terminal in response to receiving the verification success message, and
automatically transmit the remittance transaction stored in the first security area and the original text of the security value to a Central Bank Digital Currency (CBDC) ledger to cause a transaction occurring in the offline situation to be synchronized with the CBDC ledger, in response to a change from the offline situation to an online situation,
wherein each of the first security area and the second security area comprises a trusted execution environment (TEE) security area being a hardware-independent security area or a white-box cryptographic (WBC) security area.

* * * * *